(12) United States Patent
Krigmont

(10) Patent No.: US 8,449,653 B2
(45) Date of Patent: May 28, 2013

(54) SYSTEM AND METHOD FOR FLUE GAS CONDITIONING

(76) Inventor: Henry Krigmont, Seal Beach, CA (US)

( * ) Notice: Subject to any disclaimer, the term of this patent is extended or adjusted under 35 U.S.C. 154(b) by 49 days.

(21) Appl. No.: 13/169,138

(22) Filed: Jun. 27, 2011

(65) Prior Publication Data

US 2012/0058035 A1 Mar. 8, 2012

Related U.S. Application Data

(60) Provisional application No. 61/380,275, filed on Sep. 6, 2010.

(51) Int. Cl.
*B03C 3/01* (2006.01)
*B03C 3/013* (2006.01)
*B03C 3/019* (2006.01)
*B03C 3/36* (2006.01)
*C01B 17/74* (2006.01)

(52) U.S. Cl.
USPC ............... 95/58; 96/52; 422/105; 422/168; 422/177; 422/211; 423/242.1; 423/532; 423/533

(58) Field of Classification Search
USPC ............... 422/105, 168, 177, 211; 423/242.1, 423/532, 533; 95/58; 96/52
See application file for complete search history.

(56) References Cited

U.S. PATENT DOCUMENTS

| | | | | | |
|---|---|---|---|---|---|
| 3,581,463 | A | * | 6/1971 | Roberts | 95/58 |
| 5,011,516 | A | * | 4/1991 | Altman et al. | 95/58 |
| 5,240,470 | A | * | 8/1993 | Wright | 95/58 |
| 5,320,052 | A | * | 6/1994 | Spokoyny et al. | 110/345 |
| 5,582,802 | A | * | 12/1996 | Spokoyny et al. | 422/173 |
| 5,665,142 | A | * | 9/1997 | Wright | 95/58 |
| 5,980,610 | A | * | 11/1999 | Huang et al. | 95/58 |

* cited by examiner

*Primary Examiner* — Timothy Vanoy
(74) *Attorney, Agent, or Firm* — Clifford Kraft

(57) ABSTRACT

A system for enhancing the efficiency of an electrostatic precipitator in a flue gas stream that withdraws a selected amount of combustion gas from a main flue gas stream at a location downstream of the electrostatic precipitator; typically heats the selected amount of combustion gas to a predetermined temperature; passes the selected amount of combustion gas through a catalyst to convert sulfur dioxide to sulfur trioxide producing a mixture of flue gas enriched with sulfur trioxide; and returns the mixture of the flue gas enriched with the sulfur trioxide back into the main flue gas stream at a point upstream of the electrostatic precipitator. A controller can control fans, heaters and dampers as well as make computations as the required amount of sulfur trioxide needed.

21 Claims, 8 Drawing Sheets

| NO. | UNIT ID ===> | | Units 1 through 8 | | | | | | | |
|---|---|---|---|---|---|---|---|---|---|---|
| | SO₂ to SO₃ conversion Efficiency | | 90% | | 95% | | 99% | | 99.90% | |
| | ITEM | | English | Metric | English | Metric | English | Metric | English | Metric |
| 1 | Standard Conditions | Temperature | Deg. F - Deg. C | 32 | 0 | 32 | 0 | 32 | 0 | 32 | 0 |
| 2 | | Pressure | Hg - mm. H2O | 29.92 | 760 | 29.92 | 760 | 29.92 | 760 | 29.92 | 760 |
| 3 | Inlet Conditions | Temperature | Deg. F - C | 260 | 127 | 260 | 127 | 260 | 127 | 260 | 127 |
| 4 | | Flue Gas Moisture | % | 7.50 | 7.50 | 7.50 | 7.50 | 7.50 | 7.50 | 7.50 | 7.50 |
| 5 | | Site Elevation | ft - m | 100 | 30 | 100 | 30 | 100 | 30 | 100 | 30 |
| 6 | | Boiler Design Heat Input | MBtu/hr - Gcal/hr | 4,300 | 1,084 | 4,300 | 1,084 | 4,300 | 1,084 | 4,300 | 1,084 |
| 7 | | Coal Heat Value | Btu/lb | 10,050 | 5,583 | 10,050 | 5,583 | 10,050 | 5,583 | 10,050 | 5,583 |
| 8 | | Coal Burn Rate | lb/hr - kg/hr | 427,861 | 194,074 | 427,861 | 194,074 | 427,861 | 194,074 | 427,861 | 194,074 |
| 9 | | Flue Gas Flow, dry | scf/100 lb of coal (based on comb calc.) | 12,830 | | 12,830 | | 12,830 | | 12,830 | |
| 10 | | Flue Gas Flow, dry | scfm - Nm³/s | 914,909 | 432 | 914,909 | 432 | 914,909 | 432 | 914,909 | 432 |
| 11 | | Flue Gas Flow, wet | scfm - Nm³/s | 989,091 | 467 | 989,091 | 467 | 989,091 | 467 | 989,091 | 467 |
| 12 | | Flue Gas Flow, actual | acfm - m³/s | 1,569,397 | 741 | 1,569,397 | 741 | 1,569,397 | 741 | 1,569,397 | 741 |
| 13 | SO₃ System Data | SO₃ Injection Rate | ppmV | 12 | 12 | 12 | 12 | 12 | 12 | 12 | 12 |
| 14 | | SO₃ Volume | scfm - Nm3/hr | 11.87 | | 11.87 | | 11.87 | | 11.87 | |
| 15 | | SO₂ Requirement | scfm - Nm3/hr | 13.19 | | 12.49 | | 11.99 | | 11.88 | |
| 16 | | | ppmV | 13.33 | | 12.63 | | 12.12 | | 12.01 | |
| 17 | | | lb/hr - kg/hr | 141.11 | | 133.68 | | 128.28 | | 127.13 | |
| 18 | Conversion Efficiency | | % | 90% | | 95% | | 99% | | 99.90% | |
| 19 | | SO₂ in Flue Gas | ppmV | 800 | | 800 | | 800 | | 800 | |
| 20 | Calculated | Flue Gas Flow Required for iCON™ System | scfm, wet | 16,484.84 | | 15,617.22 | | 14,986.22 | | 14,851.21 | |

FIG. 5

SYSTEM AND METHOD FOR FLUE GAS CONDITIONING

The present application is related to and claims priority from U.S. Provisional Patent Application No. 61/380,275 filed Sep. 6, 2010. Application 61/380,275 is hereby incorporated by reference.

BACKGROUND

1. Field of the Invention

The present invention relates generally to dust collection using electrostatic precipitators in power generation plants, and more particularly to flue gas conditioning that adds trace amounts of sulfur trioxide ($SO_3$) into the flue gas stream.

2. Description of the Prior Art

Prior art Flue Gas Conditioning (FGC) of fly ash involves addition of trace amounts of $SO_3$ into flue gas stream to control an electrical resistivity of a dust and improve its collection in an electrostatic precipitator (ESP). FGC makes it possible to significantly improve precipitator collection efficiency at a cost considerably less than that of alternatives.

Typically, $SO_3$ is formed by a catalytic conversion of gaseous sulfur dioxide ($SO_2$). The $SO_2$ usually comes from an "external" source (feedstock) by either evaporating liquid sulfur dioxide or by burning molten or solid sulfur. Conventional flue gas conditioning systems have two major drawbacks: they require an external continuous supply of a feedstock and in the process of operation these systems slightly increase $SO_2$ emissions.

Another prior art approach to create $SO_3$ is to utilize "native" $SO_2$ formed during combustion of sulfur contained in fossil fuels as a feedstock for a subsequent conversion to $SO_3$. Extensive experiments known in the art have confirmed that at the conditions typical for coal-fired applications substantial portion of the "native" $SO_2$ could be oxidized to $SO_3$. The rate of such process will depend on the temperature, the concentrations of $SO_2$, $O_2$ and water vapors as well as catalyst's properties. Systems implementing this technique have been proposed, but none are free of major deficiencies.

The use of additives to improve dust collection rates originated shortly after commercial use of ESP's begun early in the last century. Evaporation of acid in smelter gases to reduce dust resistivity occurred in 1912; water injection into gases from cement kilns and steel refining vessels has been used for many years, and ammonia treatment of catalyst dust in petroleum refineries begun in the 1940's. Early trials of FGC showed benefits which justified continued experimentation, and encounters with several dozens of ways of doing it wrong eventually developed a set of reliable rules for doing it right. Acceptance of the flue gas conditioning process as an engineering solution to a common environmental problem has come slowly, however, one result is that use of sulfur trioxide for adjustment of the resistivity of fly ash from low sulfur coal has been widely applied and has become an accepted part of the option of switching to low sulfur coal for compliance with the Clean Air Act of 1990. It was estimated that over 50,000 megawatts of generating capacity have utilized coal-switching plus flue gas conditioning for this purpose.

Since early 1970's most of the development and application of FGC has been devoted to improving collection of fly ash generated by boilers fired with pulverized coal in power generating stations. A large fraction of the world's coals have relatively low sulfur contents and tend to generate fly ashes having electrical resistivity too high for ESP collection at optimum rates. A typical relationship between ash resistivity and ESP collection rate for large high-efficiency precipitators is with collection being maximum in the range of resistivity about 1 to $5 \times 10^9$ ohm-cm, falling off rapidly as resistivity increases and somewhat more slowly as resistivity decreases. Fly Ash Resistivity Vs. Precipitator Performance Relationship The decrease in collection rate at high resistivity is due to a "back corona" phenomena (electrical breakdown in the layer of collected ash on the collecting plates) or to the necessary reduction of precipitator power input to avoid the onset of back corona. At lower resistivity the reduction is due to increases of rapping losses and ash reentrainment as electrical holding forces in the ash layer decrease. It can be seen that too high or too low resistivity can severely impact the ESP performance.

Electrical Resistivity of Fly Ash

Electrical resistively is one of the critical parameters influencing fly ash collection by electrostatic precipitators. The electrical resistivity of fly ash depends on the chemical composition of the ash, the constituents of flue gases, and the temperature. Fly ash composition is largely determined by the type and composition of the coal being burned, and the furnace operating conditions. At lower temperatures, fly ash resistivity is determined by electrical conduction over the surface of the particles. The latter is produced by the movement of ions in molecular thickness coatings on the particles, and is termed surface resistivity.

Surface conductivity is dependent on interaction between the flue gas and the ash. Environmental factors include temperature and the concentration of gaseous and condensed phases in contact with ash. Flue gas temperature influences the concentration of water vapor, the existence of a condensed phase, and the reactivity between the ash and environment. High temperature resistivity, when plotted against inverse absolute temperature, is a straight line, illustrating conduction through the bodies of the particles, called "bulk" or volume resistivity.

Resistivity Control

Sulfur occurs in coal as organic and inorganic compounds—notably pyrite and sulfate salts. When coal is burned, more than 95 percent of the sulfur appears in the flue gas in the form of sulfur dioxide. Thermodynamics is the process-limiting factor in the boiler, for the kinetics of oxidation does not allow more than a small fraction of the sulfur oxides to appear as sulfur trioxide. When the temperature of flue gas drops to around 300° C. (572° F.), a significant fraction of the sulfur trioxide gas reacts with water vapor to produce sulfuric acid vapor. This process is essentially complete at temperatures around 150° C. (302° F.) where electrostatic precipitators normally operate. The small fraction of the total of sulfur oxides occurring as sulfur trioxide at 149° C. (300° F.) can be sufficient to lower the resistivity of ash to an acceptable range. Sulfur trioxide and water vapor are jointly adsorbed or condensed on an otherwise poorly conducting surface. The sulfuric acid vapor adsorbed on the fly ash surface directly participates in the conduction process.

The possibility of using sulfuric acid to reduce excessively high dust resistivity was known and understood from very early experience with ESP's, but general application outside the non-ferrous metals industry did not occur until the early 1970's when three factors simultaneously contributed to increased acceptability. These were the enactment and enforcement of strict limits on the emission of particulate matter and sulfur products, concomitant increase in the use of low-sulfur coals, and development of automated FGC systems based on catalytic generation of sulfur trioxide.

Possible methods for producing of a "substitute" $SO_3$ to be used for flue gas conditioning include evaporation of sulfuric acid or liquid sulfur trioxide, stripping of oleum, or catalytic conversion from sulfur dioxide. The last of these is the method chosen for all commercial installations in service at the present time because it minimizes the resident quantity of aggressively toxic material and it can be easily packaged and controlled. The system can be quickly purged, control is simple and automatic over the full range of boiler operation, it utilizes well-known and proven technology, and when burning of elemental sulfur is the source of the required sulfur dioxide, the feedstock cost is low. Liquid sulfur dioxide is sometimes used as the feedstock for small, temporary or short-lived systems, but permanent installations ordinarily use the sulfur burning process.

When resistivity control by these systems was first commercialized, the factors affecting the amount of sulfur trioxide to be injected for a given resistivity change were understood only in a general and rather superficial way. The obvious intent was to reproduce ash conditions which occurred when coal with sufficient sulfur content to produce acceptable ESP operation was burned, and on this basis rough estimates of injection rates could be made. However, early installations were intentionally made with a generous capacity margin in excess of the rough estimates and, although sufficient margin was present to handle the range of variation actually encountered, experience soon showed that the original estimates were by no means precise.

Determining Injection Rates

A parabolic characteristic of resistivity as a function of temperature in an exhaust flue gas is well known. Generally, resistivity has a maximum value at a temperature around 149° C. (300° F.) with decreasing values above and below the maximum point as illustrated by the above figure. In determining the amount of $SO_3$ required to reduce the ash resistivity to a desired lower value, one would think that the maximum rate would be required at the maximum unconditioned resistivity point, with decreasing amounts at higher and lower temperatures. That is, a curve of injection rate reflecting the unconditioned resistivity characteristic would be expected.

An interesting discovery made in the development of $SO_3$ flue gas conditioning is that the amount of $SO_3$ required to attain a desired level of resistivity follows the expected dome-shaped curve with respect to temperature only up to a point, after which it breaks off to a rapidly rising characteristic as seen in the figure. The inflection point (a knee) between the two portions of the curve is a function of the surface chemistry of the ash, occurring at relatively low temperatures for acidic ashes and at higher temperatures for basic ashes.

The range of variation of the inflection point temperature appears to be approximately from 121 to 204° C. (250 to 400° F.) for coals available worldwide. If the flue gas temperature is above the inflection point, the portion of the injected $SO_3$ which is greater than the level of the dome-shaped portion of the curve does not attach to the ash and will be passed through the ESP.

FIG. 7 shows a typical prior art sulfur burning FGC system.

Conventional or "External" Feedstock Sulfur Trioxide FGC

It is known in the art that almost all commercial $SO_3$ FGC systems installed to date are based on catalytic conversion of $SO_2$ to $SO_3$. The $SO_2$ is either supplied in liquid form or obtained by burning elemental sulfur.

Elemental sulfur is the preferred feedstock for long-term permanent operations because its operating costs are lower, but liquid $SO_2$ is typically used for trials and small or short-term situations where reduced capital costs can offset increased feedstock expense. The catalytic conversion design was chosen over other methods by which $SO_3$ may be made available partly because it is flexible and easily controllable, but mainly because it minimizes the quantity and the difficulty of handling hazardous materials resident in the system. The figure above is a diagrammatic representation of a typical sulfur-burning system for $SO_3$ conditioning. Molten sulfur is delivered by thermally-insulated tank trucks fitted with steam coils for melt-out. In locations where sulfur cannot be delivered in molten form, bagged or bulk solid sulfur may be supplied for melting on site. The sulfur grade is designated as "Bright Yellow" which contains very low levels of contaminating materials. The exact analysis varies slightly among suppliers, but completely lacks chemicals which could act as catalyst poisons and contains only very minute quantities of hydrocarbons. Storage in insulated steel tanks with steam-blanketing provisions for fire suppression is standard, but concrete-lined pits are sometimes used. Tanks and molten sulfur piping are heated by steam controlled to a saturation temperature of approximately 143° C. (290° F.) at which the sulfur has ideal flow characteristics. Steam tracing is preferred because of the ease with which controllable highly uniform temperatures can be maintained throughout the system. Typically, sulfur metering pumps are supplied in duplicate so that one may be serviced while the other is in operation.

FIG. 8 below shows a prior art FGC system with a multi-pass converter.

Prior-Art FGC System with a Multi-Pass Converter.

Combustion of the sulfur to generate $SO_2$ is obtained by introducing sulfur into an air stream which has been preheated for startup purposes to the temperature at which the catalyst becomes active. Since this temperature exceeds the auto-ignition point of molten sulfur, burning is initiated immediately upon the introduction of sulfur and $SO_2$ is delivered to the catalyst for conversion to $SO_3$. Roughly 4,000 Btu's of heat are generated per pound of sulfur burned. This replaces a portion of the startup heat input. Typically, at full system rating all the required heat to maintain the catalyst at operating temperature is supplied by sulfur combustion. Clearly, operation of the system in this manner allows the generation of any quantity of $SO_3$ from zero to full system rating as a function of any selected control signal used to determine the rate at which sulfur is delivered.

In conventional FGC systems the catalyst for conversion of $SO_2$ to $SO_3$ usually is chosen from any of the types developed for the manufacture of sulfuric acid and similar applications. Vanadium pentoxide is the active ingredient in most of these, and is classified as a hazardous material. Some FGC system designers utilize so-called "multi-pass" $SO_2$ to $SO_3$ converter design shown in the figure above. Care must be taken to exclude dust and water from the air intake to the maximum extent possible, and to service the air intake filter on a regular basis.

The hot air stream containing the generated $SO_3$ exits the $SO_2$ to $SO_3$ converter at temperatures from 399° C. (750° F.) to about 538° C. (1,000° F.), depending on the rate of $SO_3$ production. It is essential that this stream be held above its acid dew point temperature all the way through the delivery manifold and injection probes. If the temperature goes below the dew point, the acid will condense out in the manifold or the injection probes. This is undesirable for two reasons. First, none of the acid will reach the flue gas to do the intended conditioning job, and, secondly, the condensed acid will corrode the piping and nozzles. Since the $SO_3$ concentration is a few percent in this stream the acid dew point will be on the order of 238° C. (460° F.), but maintaining the delivery end of the system in a condensation-free state requires that the calculated gas temperature as it issues from the injection probe nozzles not be less than 260° C. (500° F.). For this reason the distribution manifolds are heavily insulated, and in addition the injection probes, if installed on the cold side of the air preheater, are thermally insulated from the flue gas.

The length of travel of the flue gas in the ductwork after the injection point required to provide essentially complete mixing with the $SO_3$ is often referred as "one second mixing time" or "ten times the nozzle spacing". These rules of thumb are derived from experiments showing that in turbulent flue gas flow complete mixing with another gas injected through a bank of nozzles arrayed as a uniformly spaced grid occurred at a distance downstream of the grid equal to about eight to ten times the nozzle spacing. In conventional FGC systems a nominal grid spacing of three feet has been found to be a reasonable compromise.

Because installation of injection probes is ordinarily more easily accomplished in the ESP-type ductwork on the cold side of the air pre-heater than in the boiler-type construction on the hot side, most of the present FGC installations inject on the cold side. It should be noted, however, that hot side installation has the advantages of lacking any close approach to acid condensation temperatures in the probes, and provides excellent mixing and contact between the $SO_3$ and the fly ash as it passes through the air pre-heater. Probes for hot side installation are less expensive than cold side because no thermal insulation is required and the erosion-protective outer sheathing can usually be eliminated. As far as operation is concerned, every existing hot side installation works as well as or better than equivalent cold side units.

Native Feedstock FGC Technologies

Conventional sulfur trioxide injection systems work well, and are widely used. In some instances, however, there are drawbacks. The catalytic conversion of sulfur dioxide to sulfur trioxide is not completely efficient, and additional sulfur dioxide is added to the flue gas flow. A constant supply of sulfur feedstock is required, and this feedstock must be safely handled. All components of the burning, catalyzing, and injecting system must be kept in good working order, and there is a power consumption and O&M costs associated with the process.

As previously mentioned, another approach to create $SO_3$ is to utilize a "native" $SO_2$ formed during combustion of sulfur contained in fossil fuels as a feedstock for a subsequent conversion to $SO_3$. Extensive experimentation at the Lehigh University was conducted to investigate a new approach to fly ash conditioning without an external addition of sulfur or sulfur dioxide. The method was based on causing the conversion to $SO_3$ of a portion of the $SO_2$ normally present in flue gas even when low sulfur coals were burned.

The thermodynamic laws of chemical equilibrium predict that when the gas contains about 5% $O_2$, about 99% of the $SO_2$ can be oxidized to $SO_3$ at about 399° C. (750° F.) and about 90% at 510° C. (950° F.) with respectively more $SO_3$ generated at lower temperatures and less at higher temperatures. In real life, however, not more than approximately 1-3% of the "natural" $SO_2$ is being oxidized in $SO_3$ with the rate of such reaction usually depending on the gas temperatures, the concentration of $SO_2$, $O_2$ and water vapors as well as possible catalytic properties of the boiler convection surfaces.

It has been shown in the art that it is possible to oxidize considerable quantities of $SO_2$ present in flue gas at concentration typical for commercial coal-fired boilers burning low sulfur coal, by inserting commercial catalysts in the $SO_2$-containing gas. Several systems implementing this technique have been subsequently proposed, but none are free of major deficiencies.

SUMMARY OF THE INVENTION

The present invention relates to an improved system and method for Indigenous Flue Gas Conditioning that includes withdrawing a portion of the flue gases with sulfur dioxide ($SO_2$) from a location downstream of an electrostatic precipitator (process carrier gases), removing most of the remaining dust, passing the process carrier gases through a catalyst bed where a portion of the $SO_2$ is converted into sulfur trioxide ($SO_3$), and returning these process carrier gases with the additional $SO_3$ to a location ahead of the electrostatic precipitator. The present invention provides an apparatus and method to improve the removal of particulates from combustion gases by electrostatic precipitation by sulfur trioxide conditioning. The invention permits a selectively controllable amount of sulfur trioxide to be created and added to the flue gas stream entering an electrostatic precipitator. The apparatus of the present invention used to accomplish the sulfur trioxide addition is simple and rugged, and readily controlled to precisely vary the sulfur trioxide addition. There is no sulfur burning and metering apparatus or external supply of sulfur required. No additional sulfur dioxide is added to the flue gas stream with the sulfur trioxide addition, on the contrary, the resulting $SO_2$ stack emissions are slightly reduced. No cumbersome or difficult to maintain equipment is needed, and no significant back-pressure is caused. Only a relatively minor modification to the existing ductwork is required for the present invention. A controller can compute the required sulfur trioxide flow rate, and control fans, bypass dampers and heaters to achieve that rate.

DESCRIPTION OF THE FIGURES

Attention is now directed to several illustrations which aid in understanding features of the present invention:

FIG. 5 is a table of flue gas flow requirements calculations.

Several drawings and figures have been presented to further illustrate the invention. The scope of the present invention is not limited to what is shown in the figures.

DESCRIPTION OF THE INVENTION

The present invention provides an apparatus and method to improve the removal of particulates from combustion gases by electrostatic precipitation by sulfur trioxide conditioning. This approach permits a selectively controllable amount of sulfur trioxide to be created and added to the flue gas stream entering the electrostatic precipitator. No additional sulfur dioxide is added to the flue gas stream with the sulfur trioxide addition. No cumbersome or difficult to maintain equipment is required. No significant back-pressure is caused by the system of the present invention. Only a relatively minor modification to the duct work is required for the present invention.

In accordance with the invention, a sulfur trioxide conditioning system is provided for use in a fossil fuel-burning facility having a main duct for transporting sulfur dioxide-containing flue gas from a boiler, through various heat recovery apparatuses, and to particulate removal equipment, such as an electrostatic precipitator, for subsequent discharge clean flue gases through a stack. The sulfur trioxide conditioning system can include a catalytic converter for converting a portion of the sulfur dioxide in the flue gas to sulfur trioxide.

A particular embodiment of the present invention can include the steps:

1. withdrawing a selected/predetermined amount of the total volume of the combustion gases exiting the boiler (process carrier gas) containing substantially reduced amount of the particulates associated with that minor amount of combustion gases from a location downstream of the electrostatic precipitator;
2. optionally removing the remainder of the entrained particulate with an aid of a mechanical means (such as a filter);
3. preheating the process carrier gas up to a predetermined temperature in accordance with the specifications related to a particular catalyst;
4. contacting the selected/predetermined amount of process carrier gases with a catalyst to convert sulfur dioxide in the process carrier gas to sulfur trioxide ($SO_2$ to $SO_3$);
5. returning the mixture of the clean process carrier gases enriched with the $SO_3$ back into the main flue gas stream at a point ahead (upstream) of the electrostatic precipitator;
6. mixing the process carrier gas with the main flue gas stream;
7. subjecting the total mixture to electrostatic precipitation.

Figure 1:
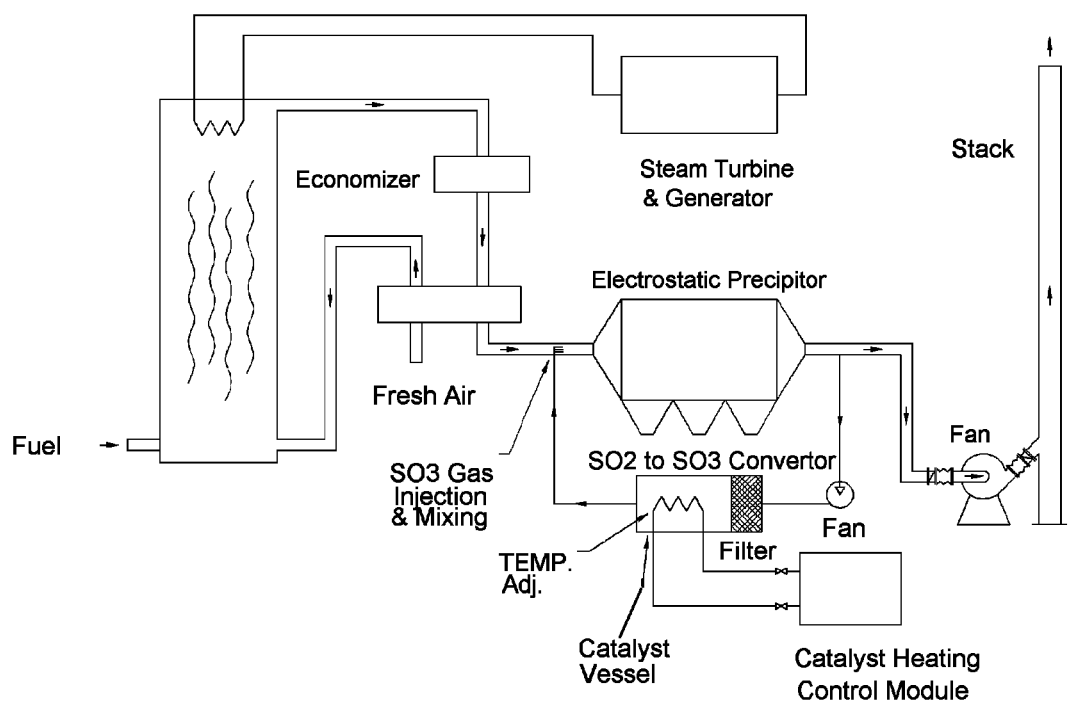
FIG. 1 shows a schematic diagram of an embodiment of the present invention with temperature control.

In a particular embodiment of the present invention shown in FIG. 1, the catalyst is disposed in a separate vessel furnished with a heater to enable precise control of the catalytic conversion process of sulfur dioxide in the process carrier gas to sulfur trioxide ($SO_2$ to $SO_3$). The heater is normally located inside of the catalyst providing the ability of nearly instant heating of the core catalyst. Optionally, heating can be accomplished by preheating the incoming process carrier gas by using gas-fired duct-burners or any other means to heat the incoming process carrier gas up to the required catalyst temperature (called catalyst ignition temperature). The $SO_2$ to $SO_3$ conversion reaction is exothermic, hence, when required, cooling can be accomplished by reducing the heat input causing cooling to take place by convection in the converter vessel since the process carrier gases withdrawn from the main flue duct are at the temperature substantially lower that required for the catalyst ignition.

The catalytic converter generally includes a catalyst disposed in a separate vessel for the oxidation of sulfur dioxide to sulfur trioxide. The catalyst vessel can be located anywhere depending upon design requirements; its inlet, however, communicates with a location downstream of the electrostatic precipitator; hence, the process carrier gases entering it are already relatively clean having passed through the electrostatic precipitator. The remaining effluent can be further reduced by any suitable mechanical means, for example a mechanical filter or a HEPA filter.

The conditioning system may further include selectively variable temperature modifier in communication with the catalyst to selectively vary the temperature of the catalyst body, to, in turn, preheat the catalyst to an ignition temperature specified by the catalyst manufacturer to ensure the efficient catalytic operation, and further to vary the amount of catalytic conversion of sulfur dioxide to sulfur trioxide in the process carrier gas. The heater operates independently of the temperature of the gas.

The temperature modifier may be operable to heat or to cool the catalyst. Such a temperature modifier can include, for example, an electrical heater within, or on, the catalyst vessel. In another embodiment the temperature modification can be accomplished by heating the process carrier gases ahead of the catalyst vessel by natural gas-burning in-duct heaters or similar apparatus. To cool the catalyst a simple reduction of the amount of the additional heat is all that is necessary since the clean process carrier gases temperature downstream of the electrostatic precipitator is significantly lower then the required catalyst ignition temperature.

The temperature modifier typically adjusts the catalyst temperature to a pre-selected level. The extent of the catalytically aided reaction is typically a strong function of the temperature of the catalyst. The present invention provides to a direct or an indirect adjustment of the catalyst temperature to that required, achieving the desired extent of reaction of the process carrier gas passing over the catalyst.

Figure 2:
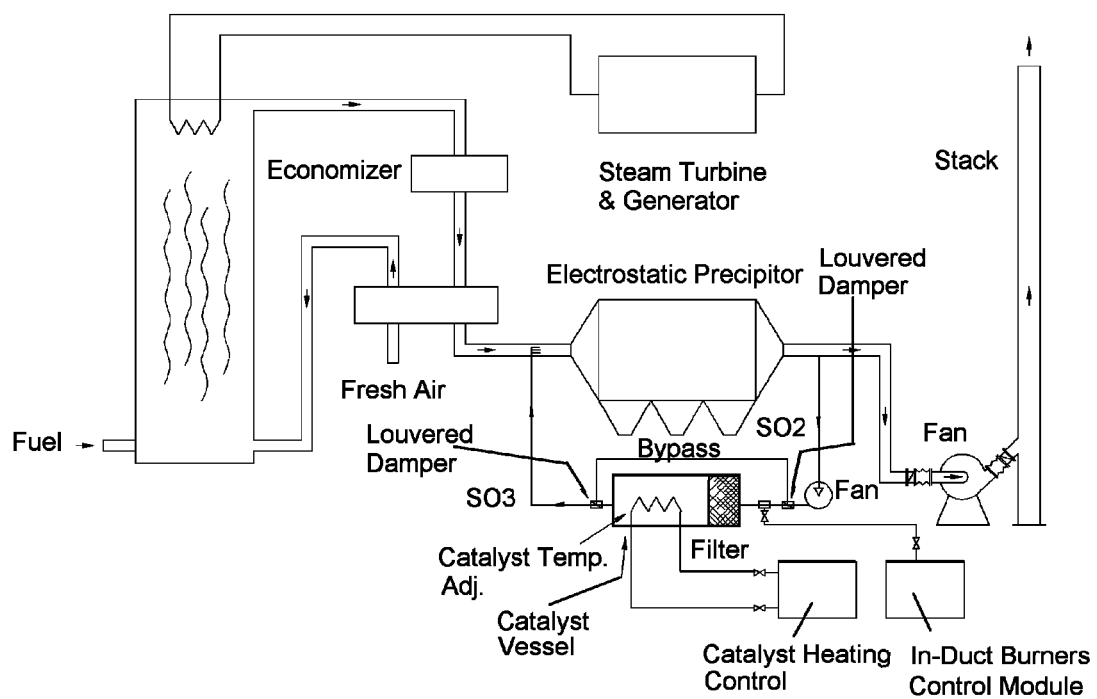
FIG. 2 shows the embodiment of FIG. 1 with bypass control and in-duct preheating.

In another embodiment shown in FIG. 2, the catalyst is also preheated as above to the required operating temperature, but in order to control the amount of the $SO_3$ produced/generated a "Bypass Line" is provided to allow a predetermined amount of untreated process carrier gases to bypass the catalytic converter vessel. That is with the bypass fully closed, the amount of the $SO_3$ generated is at maximum level; with the bypass line fully opened, the amount of the $SO_3$ generated is at the minimum since the catalyst converter respectively receives the minimum amount of the incoming process carrier gases with $SO_2$.

Figure 3:
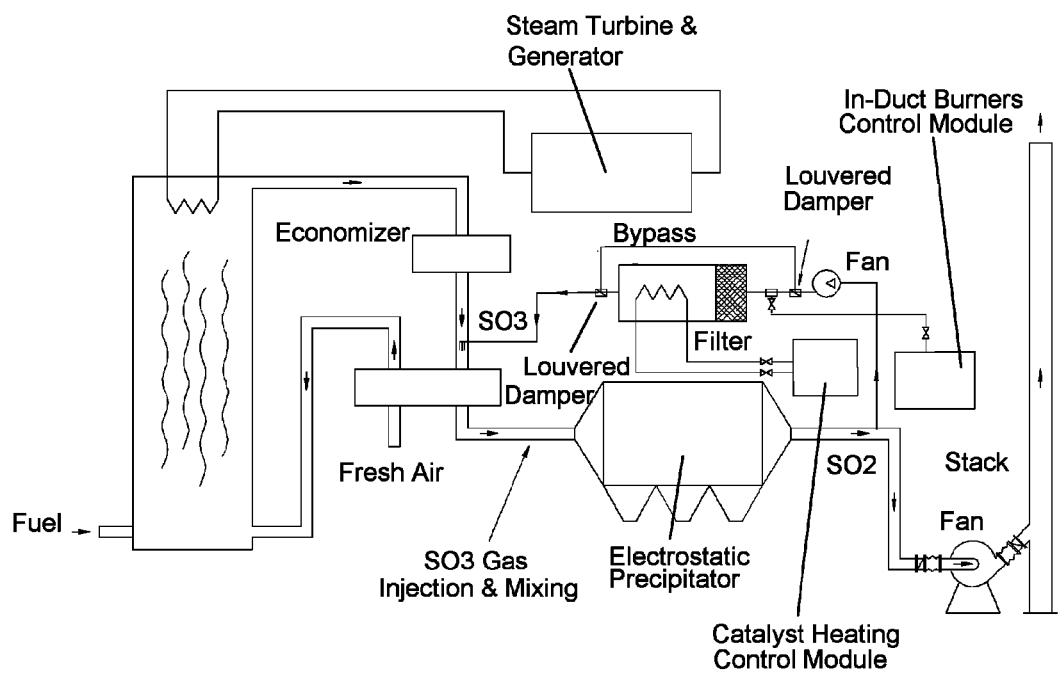
FIG. 3 shows an embodiment of the present invention with hot side sulfur trioxide injection.

The process carrier gases with generated $SO_3$ can be returned back to the boiler flue gas flow (injected) either immediately upstream (ahead) of the electrostatic precipitator (cold-side, downstream of any air pre-heater), or upstream (ahead) of an air pre-heater (hot-side). This is shown in FIG. 3. This simplifies both the overall injection system design as well as the system operation as to the injected gases mixing and distribution.

The present invention is particularly effective in controlling the extent of reaction where a relatively small amount of the reactive component of the flue gas is to be catalytically converted. The heating or cooling of the catalyst, as required, is highly effective in precisely controlling the extent of conversion.

Figure 4:
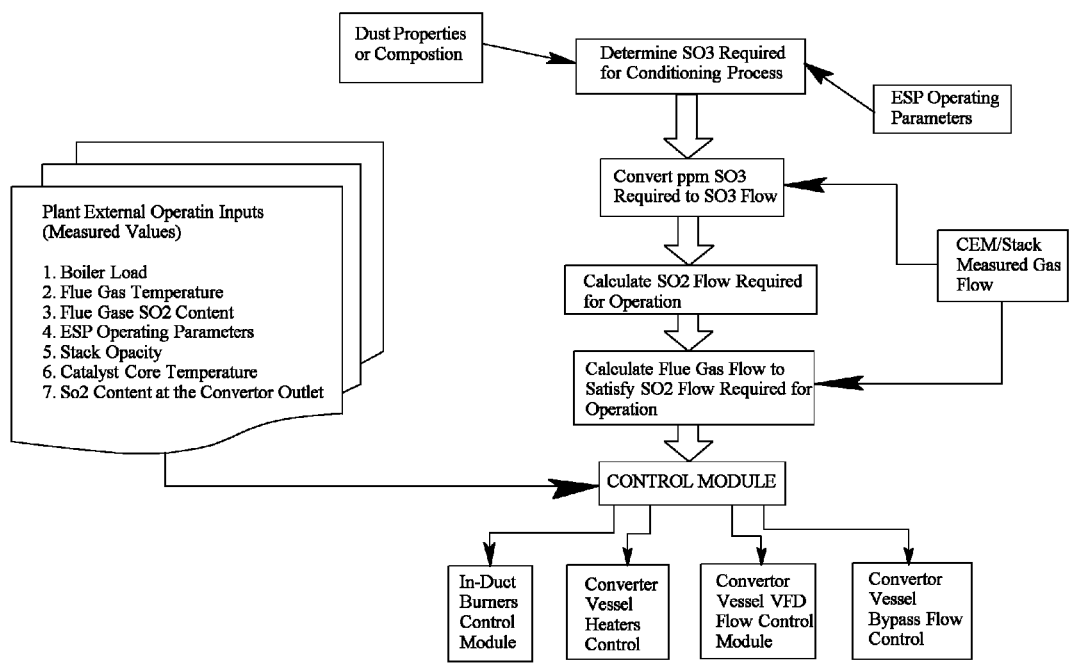
FIG. 4 shows a diagram of an embodiment of a control module and algorithm.

The following is a step-by-step operation of a control system according to the present invention as shown in FIG. 4:

1. Determine the amount of the $SO_3$ necessary for the flue gas conditioning using dust properties or composition and ESP operating parameters.
2. Convert the $SO_3$ concentration from the Step 1 to the $SO_3$ gas flow using CEM/Stack measured gas flow.
3. Compute the amount of the $SO_2$ required to sustain the calculated $SO_3$ flow.
4. Measure the $SO_2$ content of the flue gases.
5. Calculate the process carrier gas flow to satisfy the $SO_2$ required in the Step 3.
6. Set a Fan's Variable Frequency Drive (VFD) or other control and Bypass Flow Control Dampers to ensure the process carrier gas flow entering the catalyst vessel is sufficient to satisfy the $SO_3$ requirement.
7. Determine the required catalyst bed temperature to ensure the desired $SO_2$ to $SO_3$ conversion reaction.

8. Set the Converter Vessel Internal Heaters and/or the External In-Duct Burners to ensure the desired Catalyst Bed temperature.

The table of FIG. 5 presents a sample set of calculations to estimate the process carrier gas flow required to satisfy the system operation requirements.

The temperature modifier adjusts the catalyst temperature to a pre-selected level. The $SO_2$ to $SO_3$ conversion is an exothermic reaction, hence the extent of this catalytically aided reaction is typically a strong function of the temperature of the catalyst. The present approach directly adjusts the catalyst temperature to that required to achieve the desired extent of reaction of the process carrier gas passing over the catalyst.

Figure 6:
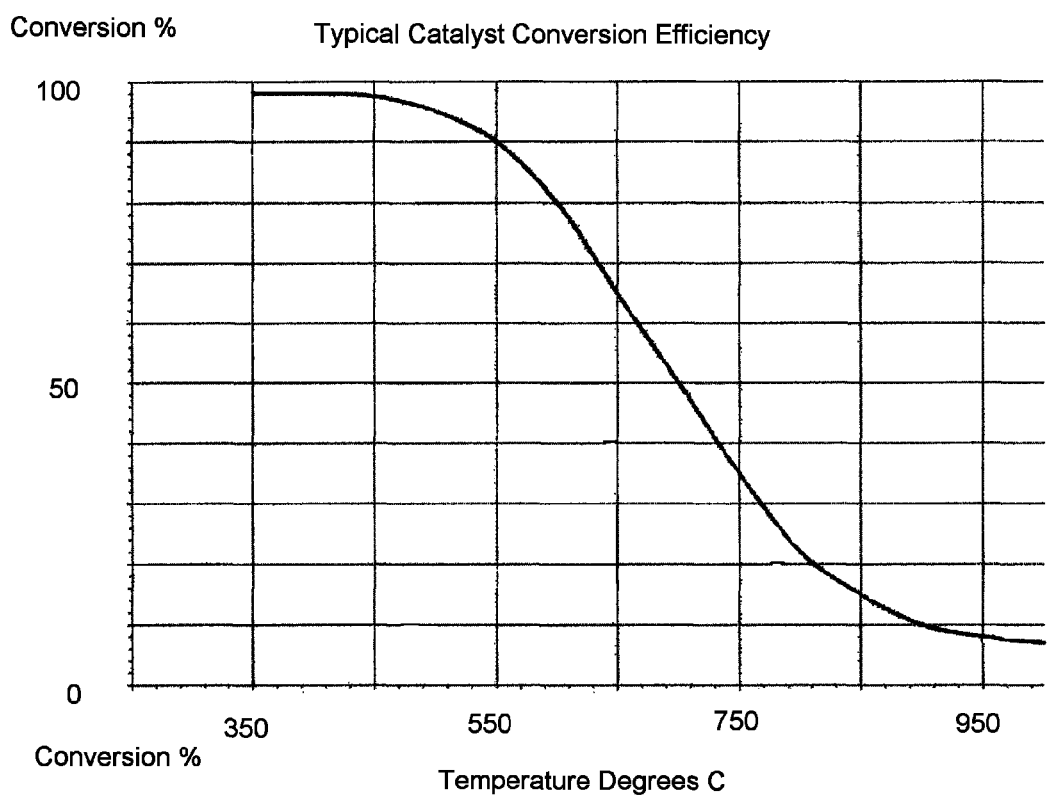
FIG. 6 is a graph of catalyst efficiency vs. temperature.
Figure 7:
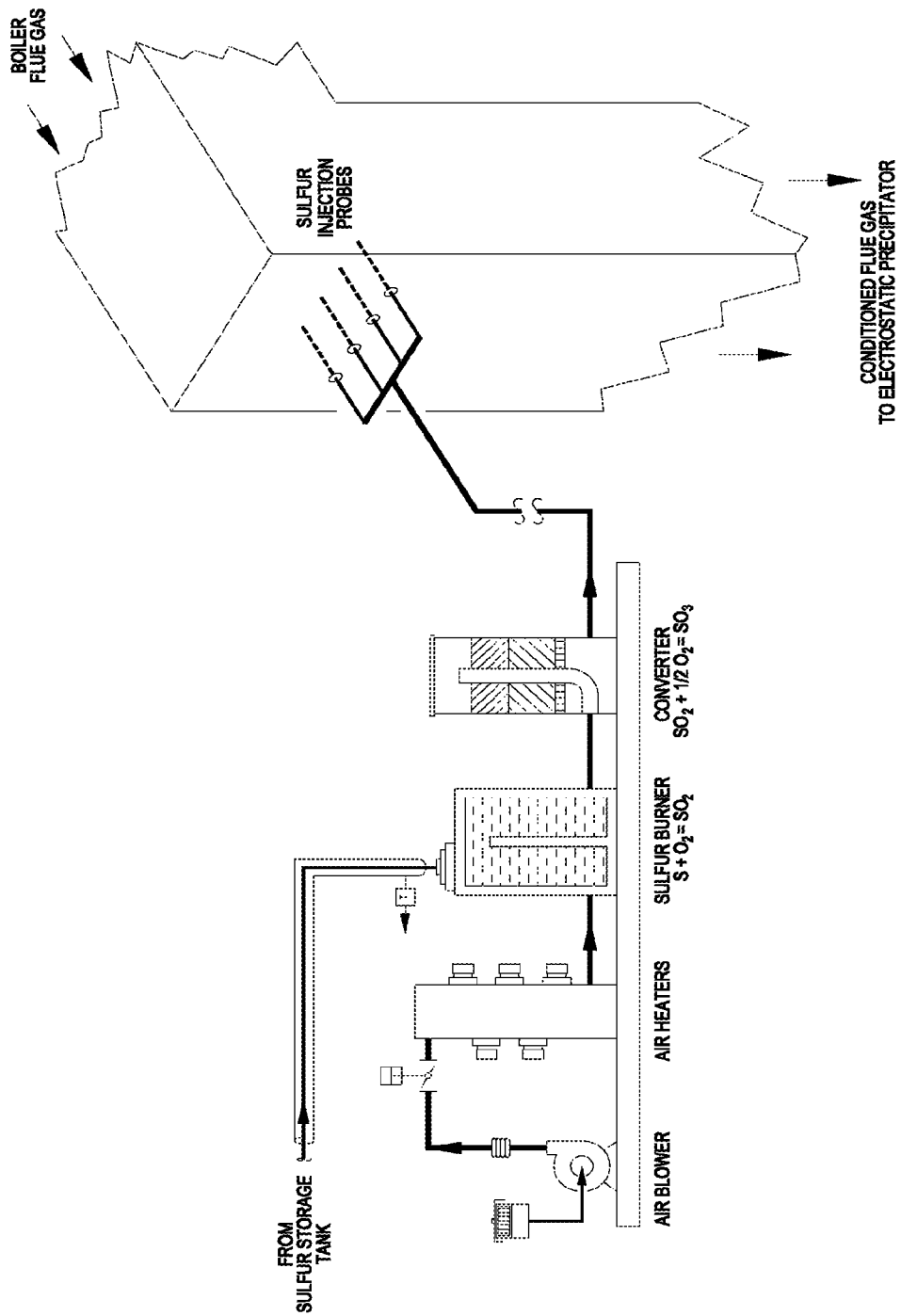
FIG. 7 shows a typical prior-art sulfur-burning FGC system.
Figure 8:
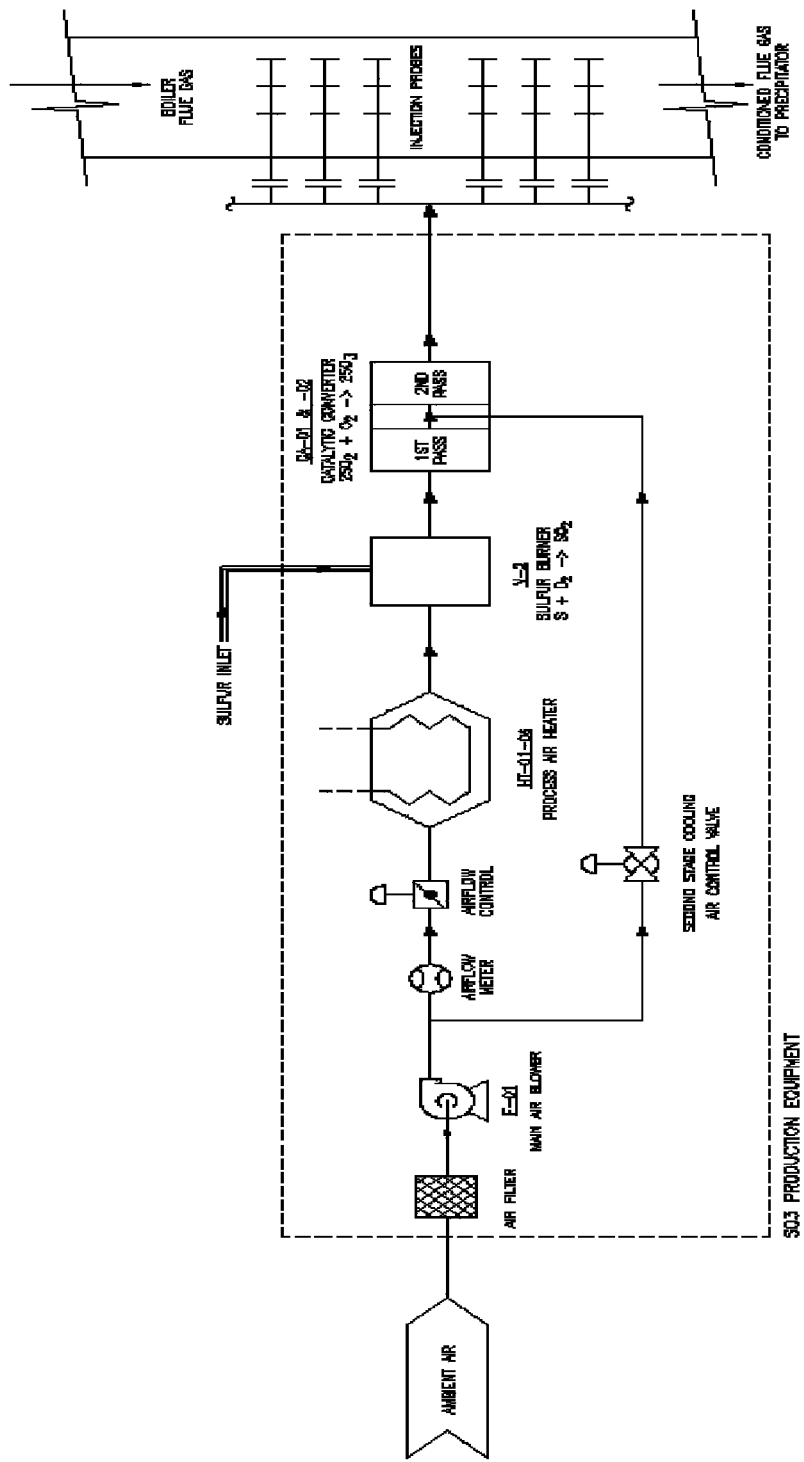
FIG. 8 shows a prior-art FGC system with a multi-pass converter.

FIG. 6 shows the relationship between catalytic efficiency and temperature typical of common catalysts known in the art. It can be seen from the graph that the extent of a catalyzed reaction is normally strongly dependent upon the temperature of the catalyst in the catalyst converter vessel. In the converter vessel, sulfur dioxide is converted to sulfur trioxide. The reaction is exothermic and heat quickly builds up in the converter vessel reducing the equilibrium yield of this exothermic reaction. FIG. 6 illustrates the equilibrium yield of the reaction at different temperatures. The reaction mixture in the converter is typically maintained at temperatures around 400° C. to 500° C. and 1 Atm pressure. In practice, the preferred range of conversion of $SO_2$ to $SO_3$ is from 90 to 99%, and even more preferred is from 90 to 96%, and is proportional, respectively, to the adjustment in the temperature of catalyst.

At a point downstream of the location of the catalyst vessel, there may be provided an instrument to assess the extent of the $SO_2$ to $SO_3$ conversion reaction by the catalyst. This can be a sulfur trioxide monitor to measure the $SO_3$ content of the process carrier gases. The determination of the sulfur dioxide content of the process carrier gas, before and after it passes through the flue gas conditioning system of the present invention, is another way of assessing the effectiveness of the flue gas conditioning system. On the other hand, the extent of the reaction may also be assessed by its effect on the performance of other parts of the pollution control system, for example, an opacity measurement at the stack exit, the power consumption within the precipitator, gas temperature, and the like. The degree of heating or cooling of the catalyst by the temperature means may be controlled by a direct catalyst bed temperature measurement, or otherwise.

A control signal from either a monitor or the electrostatic precipitator, or otherwise (i.e. boiler operating conditions) is received by a control unit. The control unit determines whether greater or less temperature modification is required and sends a command signal to a modifying control unit. The modifying control unit alters the temperature setting of a heating means controller thereby completing the control loop.

The present invention substantially improves in situ flue gas conditioning technology by providing simple yet reliable system to furnish in a fully controlled manner, the required amount of sulfur trioxide for efficient electrostatic precipitator operation without adding more sulfur oxides to the system (in fact, the amount of sulfur dioxide in the system is typically reduced).

The present invention involves no moving parts inserted into the flue gas stream, and no alteration of the flow of the flue gas stream. Only the temperature of the catalyst and the catalyst converter bypass flow is changed and controlled, thereby changing the extent of the catalyzed reaction. In the preferred embodiment, the temperature of the catalyst is initially set by the induct gas fired heaters and adjusted or modulated from the "inside" by altering the temperature of the catalyst core, rather than from the "outside" by changing the temperature of the shell. As the process carrier gas passes over the catalyst, its temperature may change only to a minor degree since the contact time between process carrier gas and the catalyst is relatively short.

The following is a list of benefits of the present invention:
1. Reduced emissions of the $SO_2$ in the exhaust flue gas stream.
2. No need in the additional feedstock (molten or dry sulfur, liquid $SO_2$, etc.)
3. No need for a substantial size storage vessel for the external feedstock with respective unloading and metering apparatuses.
4. Rugged mechanism, reliable and simple in the operation.
5. Uniform or pre-selected $SO_3$ distribution.
6. Suitable for an automatic control.
7. Automatic compensation for the catalyst aging.
8. No additional pressure drop during operation and adjustment.
9. Substantially reduced capital cost, maintenance and operating expenses.

Several descriptions and illustrations have been presented to aid in understanding features of the present invention. One skilled in the art will realize that numerous changes and variations are possible without departing from the spirit of the invention. Each of these changes and variations is within the scope of the present invention.

I claim:

1. A method of enhancing efficiency of an electrostatic precipitator in a flue gas stream comprising:
    withdrawing a selected amount of combustion gas from a main flue gas stream at a location downstream of the electrostatic precipitator;
    contacting said selected amount of combustion gas with a catalyst to convert sulfur dioxide to sulfur trioxide producing a mixture of clean process carrier gas enriched with sulfur trioxide;
    returning said mixture of the clean process carrier gas enriched with the sulfur trioxide back into the main flue gas stream at a point upstream of the electrostatic precipitator.

2. The method of claim 1 further comprising: allowing a portion of said selected amount of process carrier gas to bypass said catalyst.

3. The method of claim 2 wherein said portion is controlled by bypass flow control dampers.

4. The method of claim 1 wherein said catalyst is heated.

5. The method of claim 1 further comprising controlling converter vessel heaters or coolers to produce a predetermined sulfur trioxide flow.

6. The method of claim 1 further comprising controlling in-duct burners that preheat said selected amount of process carrier gas before it contacts said catalyst.

7. The method of claim 1 wherein dust properties or composition are used to compute a required amount of sulfur trioxide to enrich said flue gas.

8. The method of claim 1 further comprising removing most of remaining entrained particulate from said selected amount of combustion gas.

9. The method of claim 1 further comprising measuring sulfur dioxide content in said main flue gas stream.

10. A method of enhancing efficiency of an electrostatic precipitator in a flue gas stream comprising:
    a) determining an $SO_3$ concentration required for the flue gas conditioning;

b) converting the $SO_3$ concentration from the step a) to $SO_3$ gas flow;
c) computing an amount of $SO_2$ required to sustain the $SO_3$ gas flow from step b);
d) measuring $SO_2$ content of the flue gas stream;
e) computing a process carrier gas flow to satisfy the amount $SO_2$ required in the step c),
f) setting fan and bypass flow control dampers to ensure the process carrier gas flow entering a catalyst vessel is sufficient to satisfy the $SO_3$ gas flow from step b);
wherein, said fan extracts a portion of flue gas from a flue gas stream at a location downstream of an electrostatic precipitator and forces said portion across a catalyst to convert $SO_2$ to $SO_3$, wherein the $SO_3$ is re-injected into the flue gas stream at a location upstream of said electrostatic precipitator, and wherein said bypass flow control dampers allow some of said portion to bypass said catalyst.

11. The method of claim 10 wherein said catalyst is heated.

12. The method of claim 10 wherein the catalyst is cooled.

13. The method of claim 10 further comprising determining a required catalyst bed temperature to ensure an $SO_2$ to $SO_3$ conversion reaction to satisfy the $SO_3$ gas flow from step b).

14. The method of claim 10 further comprising setting converter vessel internal heaters or coolers and/or external in-duct burners to achieve the required catalyst bed temperature.

15. A system for enhancing performance of an electrostatic precipitator comprising:
a catalyst bed;
a bypass that extracts a portion of flue gas (process carrier gas) from a flue gas flow at a point downstream of said electrostatic precipitator and routes it through said catalyst bed;
a return that routes process carrier gas from said catalyst bed back into said flue gas flow at a point upstream of said electrostatic precipitator;
wherein, said catalyst bed converts sulfur dioxide to sulfur trioxide.

16. The system of claim 15 wherein said catalyst bed is heated.

17. The system of claim 16 wherein a catalyst bed heater is controlled to produce a required amount of sulfur trioxide.

18. The system of claim 15 further comprising a gas bypass around said catalyst bed.

19. The system of claim 15 further comprising an in-duct pre-heater that heats said portion before it enters said catalyst bed.

20. The system of claim 15 further comprising a control unit that a) determines a required amount of sulfur trioxide for precipitator conditioning; b) converts the required amount sulfur trioxide amount to required sulfur trioxide flow; c) determines a required sulfur dioxide flow and catalyst bed temperature to achieve the required sulfur trioxide flow; d) measures sulfur dioxide content of said flue gas, and e) controls in-duct burners, coolers and/or catalyst bypass dampers to achieve the required sulfur dioxide flow and the required sulfur trioxide flow.

21. The system of claim 15 wherein said return routes said gas from said catalyst bed back into said flue gas flow at a point on a hot-side of an air pre-heater.

* * * * *